(12) United States Patent
Shen et al.

(10) Patent No.: US 9,465,416 B2
(45) Date of Patent: Oct. 11, 2016

(54) ELECTRONIC DEVICE

(71) Applicant: Acer Incorporated, New Taipei (TW)

(72) Inventors: Chao-Di Shen, New Taipei (TW); Yan-Lin Kuo, New Taipei (TW)

(73) Assignee: Acer Incorporated, New Taipei (TW)

( * ) Notice: Subject to any disclaimer, the term of this patent is extended or adjusted under 35 U.S.C. 154(b) by 0 days.

(21) Appl. No.: 14/788,816

(22) Filed: Jul. 1, 2015

(65) Prior Publication Data

US 2016/0266617 A1    Sep. 15, 2016

(30) Foreign Application Priority Data

Mar. 10, 2015  (TW) .............................. 104107631 A

(51) Int. Cl.
*G06F 1/16* (2006.01)
*G06F 3/0354* (2013.01)

(52) U.S. Cl.
CPC ......... *G06F 1/1692* (2013.01); *G06F 3/03547* (2013.01)

(58) Field of Classification Search
CPC .... G06F 1/169; G06F 1/1643; G06F 1/1692; G06F 3/03547
See application file for complete search history.

(56) References Cited

U.S. PATENT DOCUMENTS

| | | | | |
|---|---|---|---|---|
| 5,287,246 A * | 2/1994 | Sen | .......................... | G06F 1/169 361/679.1 |
| 5,339,213 A * | 8/1994 | O'Callaghan | ....... | G06F 3/03547 248/442.2 |
| 5,546,334 A * | 8/1996 | Hsieh | .................... | G06F 1/1616 345/167 |
| 5,793,355 A * | 8/1998 | Youens | .................. | G06F 1/169 345/156 |
| 6,163,326 A * | 12/2000 | Klein | .................... | G06F 1/1616 345/156 |
| 6,166,722 A * | 12/2000 | Kawabe | ................ | G06F 1/1616 345/163 |
| 6,281,887 B1 * | 8/2001 | Wang | .................. | G06F 3/03547 345/173 |
| 6,476,795 B1 * | 11/2002 | Derocher | .............. | G06F 1/1616 320/114 |
| 6,859,355 B2 * | 2/2005 | Chuang | ................... | G06F 1/169 345/158 |
| 7,085,130 B2 * | 8/2006 | Lin | ......................... | G06F 1/169 200/344 |
| 7,633,492 B2 * | 12/2009 | Hsu | ...................... | G06F 3/03547 345/173 |
| 7,948,741 B2 * | 5/2011 | Fan | ......................... | G06F 1/169 361/679.1 |
| 8,174,846 B2 * | 5/2012 | Hamada | .................. | G06F 1/169 361/728 |
| 8,213,166 B2 * | 7/2012 | Mihara | ................. | G06F 1/1616 345/160 |
| 8,373,977 B2 * | 2/2013 | Shao | ..................... | G06F 1/1616 345/158 |

(Continued)

FOREIGN PATENT DOCUMENTS

TW        200910173      3/2009
WO        2013142468     9/2013

*Primary Examiner* — Lisa Lea Edmonds
(74) *Attorney, Agent, or Firm* — Jianq Chyun IP Office

(57) ABSTRACT

An electronic device including a first case, a first protrusion, a click pad and a frame is provided. The first case has an accommodating cavity, wherein the accommodating cavity is recessed from a surface of the first case and forms a bottom plate, first and second side walls which are erected on one pair of opposite sides of the bottom plate, and two third side walls which are erected on another pair of opposite sides of the bottom plate. The first protrusion is disposed on the bottom plate. The click pad has a switch. The frame is disposed between the first case and the clip pad, wherein the click pad is assembled in the accommodating cavity by the frame, and the switch directly faces to the first protrusion.

12 Claims, 6 Drawing Sheets

(56) References Cited

U.S. PATENT DOCUMENTS

| | | | | |
|---|---|---|---|---|
| 8,441,450 B2* | 5/2013 | Degner | | G06F 3/03547 |
| | | | | 178/18.01 |
| 8,552,991 B2* | 10/2013 | Yoon | | G06F 1/1616 |
| | | | | 345/173 |
| 8,854,800 B2* | 10/2014 | Song | | G06F 1/1616 |
| | | | | 345/157 |
| 9,025,322 B2* | 5/2015 | Chang | | G06F 1/1662 |
| | | | | 345/168 |
| 9,110,638 B2* | 8/2015 | Yang | | G06F 1/169 |
| 9,176,619 B2* | 11/2015 | Takata | | G06F 3/0414 |
| 9,229,538 B2* | 1/2016 | Kao | | G06F 3/03 |
| 9,292,051 B2* | 3/2016 | Takata | | G06F 3/0338 |
| 2007/0205919 A1* | 9/2007 | Wu | | G06F 3/0219 |
| | | | | 341/22 |
| 2008/0174941 A1* | 7/2008 | Mundt | | G06F 1/1616 |
| | | | | 361/679.08 |
| 2009/0174678 A1* | 7/2009 | Mathew | | G06F 1/1616 |
| | | | | 345/173 |
| 2011/0080354 A1 | 4/2011 | Chiang et al. | | |
| 2012/0314347 A1* | 12/2012 | Zhang | | G06F 1/169 |
| | | | | 361/679.1 |
| 2013/0234938 A1* | 9/2013 | Xue | | G06F 1/169 |
| | | | | 345/158 |
| 2014/0204507 A1* | 7/2014 | Su | | H01H 13/14 |
| | | | | 361/679.01 |

\* cited by examiner

ELECTRONIC DEVICE

CROSS-REFERENCE TO RELATED APPLICATION

This application claims the priority benefit of Taiwan application serial no. 104107631, filed on Mar. 10, 2015. The entirety of the above-mentioned patent application is hereby incorporated by reference herein and made a part of this specification.

BACKGROUND OF THE INVENTION

1. Field of the Invention

The invention relates to an electronic device and more particularly to an electronic device having a click pad.

2. Description of the Related Art

As the technology industries develop in recent years, electronic devices, such as notebook computer, tablet PC, or smart phone, are frequently used in our daily life. Types and functions of the electronic devices are increasingly diversified, and the electronic devices are more popular due to convenience and practicality thereof and can be used for different purposes.

The electronic device, such as a notebook computer, is generally configured to have a keyboard and a click pad as input interfaces. The click pad usually corresponds to a switch, which is disposed inside the electronic device, so that the user can trigger the switch by single-clicking or double-clicking on the click pad.

Generally, a rectangular opening is disposed on a case of a traditional notebook computer, and the click pad is installed in the rectangular opening. Furthermore, a supporting plate is disposed below the click pad and used to trigger the above-mentioned switch. However, when the supporting plate is assembled, the flatness of the supporting plate needs being well maintained to help the user can retain a good sense of touch, so that the assembling condition is stricter. In addition, if the case has a penetration opening, the structural strength of the case will decrease.

SUMMARY OF THE INVENTION

The invention provides an electronic device having a click pad that provides for the user a good sense of touch, and the structural strength of entire electronic device could be well maintained.

The electronic device of the invention includes a first case, a first protrusion, the click pad and a frame. The first case has an accommodating cavity, wherein the accommodating cavity is recessed from a surface of the first case and forms a bottom plate, a first side wall and a second side wall which are erected on one pair of opposite sides of the bottom plate, and two third side walls which are erected on another pair of opposite sides of the bottom plate. The first protrusion is disposed on the bottom plate. The click pad has a switch. The frame is disposed between the first case and the click pad, wherein the click pad is assembled in the accommodating cavity by the frame, and the switch faces directly to the first protrusion.

In summary, in the electronic device of the invention, when the clip pad is assembled into the accommodating cavity of the first case by the frame, the first protrusion disposed on the bottom plate of the case faces directly to the switch of the click pad. The switch of the click pad is triggered by the first protrusion that is disposed on the bottom plate formed by the accommodating cavity, so that the flatness between the first protrusion and the first case is increased, and the pressing stroke of the switch is not affected and not changed by the flatness. Therefore, the click pad could provide a good sense of touch. In addition, the case does not need having a big penetration opening so that the structural strength of the electronic device could be well maintained.

To make the aforesaid features and advantages of the invention more comprehensible, several embodiments accompanied with drawings are described in details as follows.

DESCRIPTION OF EMBODIMENTS

Figure 1:
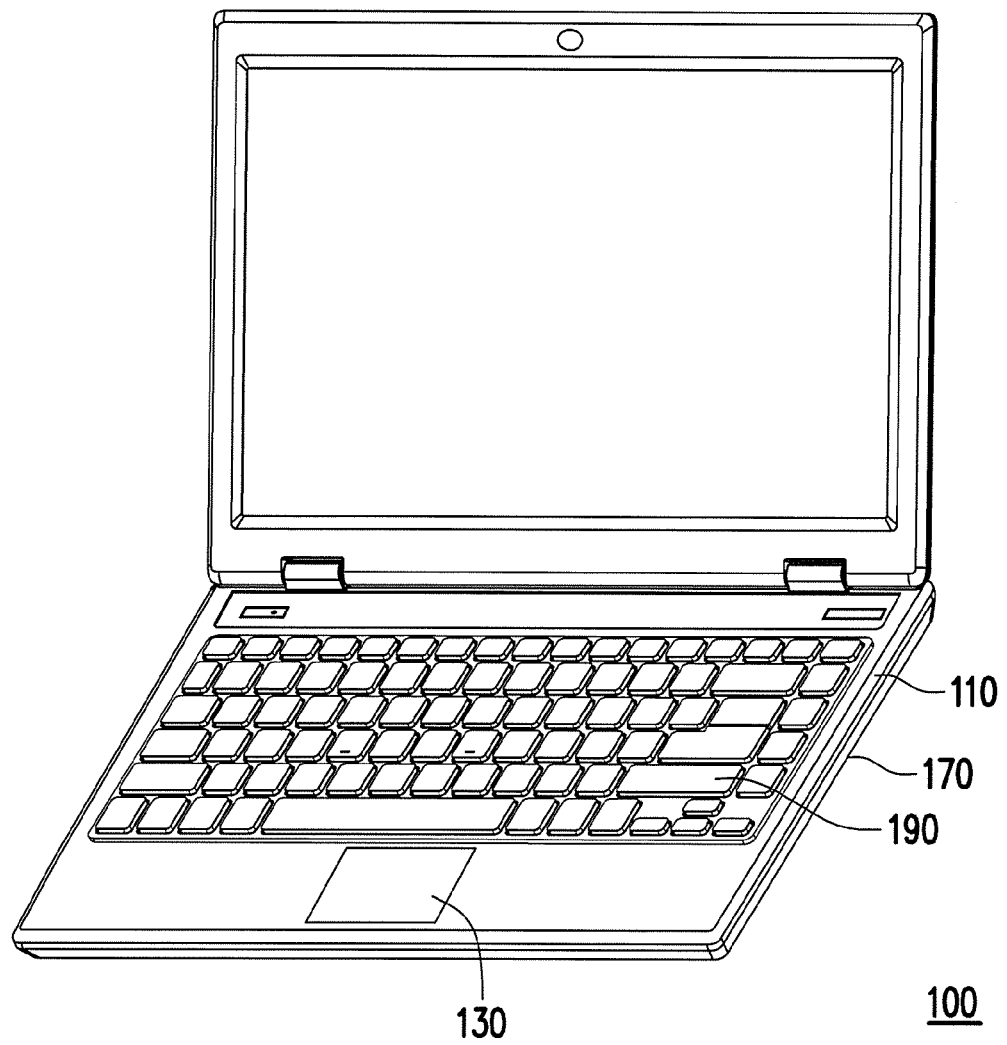
FIG. 1 is a perspective view of an electronic device according to one embodiment of the invention.
Figure 2:
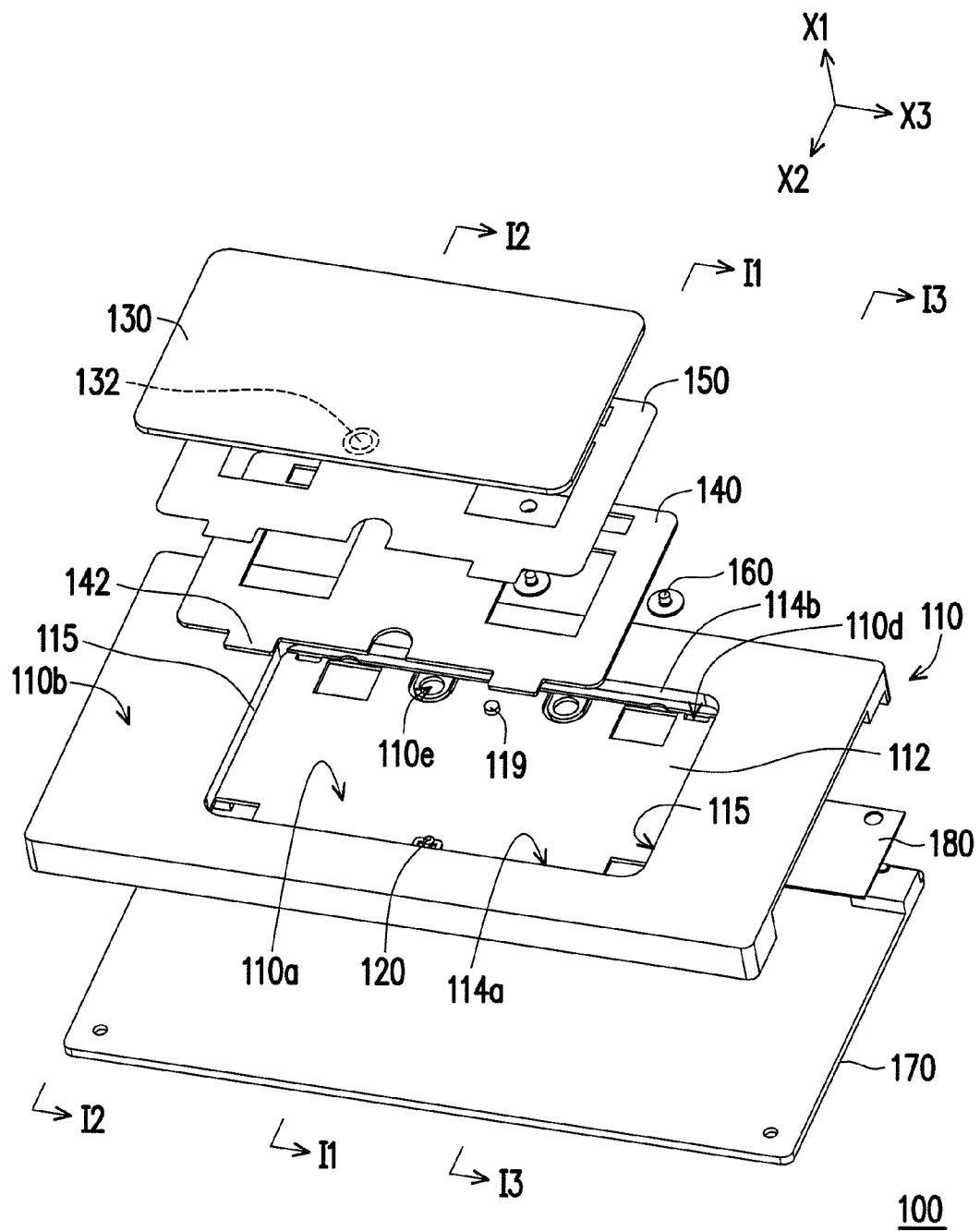
FIG. 2 is an exploded view of the electronic device in FIG. 1.
Figure 3:
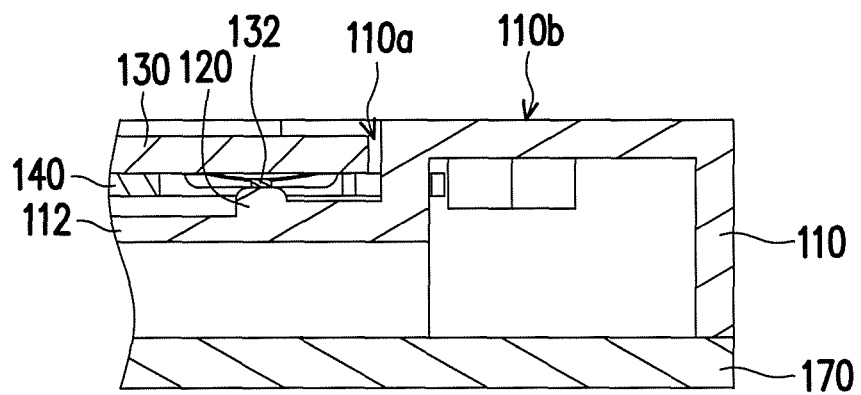
FIG. 3 is a partial cross-sectional view of a click pad assembled in an accommodating cavity taken along section line I1-I1 in FIG. 2.

FIG. 1 is a perspective view of an electronic device according to one embodiment of the invention. FIG. 2 is an exploded view of the electronic device in FIG. 1. FIG. 3 is a partial cross-sectional view of the electronic device taken along section line I1-I1 in FIG. 2. Referring to FIG. 1, FIG. 2 and FIG. 3, in the present embodiment, the electronic device 100 includes a first case 110, a first protrusion 120, a click pad 130 and a frame 140. In addition, the electronic device 100, for example, is a notebook computer, but the types of the electronic device 100 of the invention are not limited thereto. Any electronic device which uses the click pad 130 as an input interface could be applied for the present embodiment. It is noted that, only a part of the first case 100 in FIG. 2 is shown for a purpose of clear view.

The first case 110 has an accommodating cavity 110a, wherein the accommodating cavity 110a is recessed from a surface 110b of the first case 110 and forms a bottom plate 112, a first side wall 114a and a second side wall 114b which are erected on one pair of opposite sides of the bottom plate 112, and two third side walls 115 which are erected on another pair of opposite sides of the bottom plate 112. The first protrusion 120 is disposed on the bottom plate 112. The click pad 130 has a switch 132. The frame 140 is disposed between the first case 110 and the click pad 130, wherein the click pad 130 is assembled in the accommodating cavity 110a by the frame 140, and the switch 132 faces directly to the first protrusion 120. Because the first protrusion 120 is directly disposed on the bottom plate 112 formed by the accommodating cavity 110a and faces directly to the switch 132, the flatness of the first protrusion 120 and the first case 110 after assembled is increased. When the switch 132 of the click pad 130 is pressed, the pressing stroke of the switch 132 is not affected and not changed by the skewness of the assembly. Therefore, the click pad 130 could provide a good sense of touch. In addition, the electronic device 100 doesn't need an extra supporting plate for triggering the switch 132 so that the number of elements in the electronic device 100 will be reduced and it is more convenient to assemble the electronic device 100. Furthermore, the first case 100 does not need having a big penetration opening so that the structural strength of the electronic device 100 could be well maintained.

In this embodiment, the first protrusion 120 and the first case 110 could be formed together by injection molding method, but the invention is not limited thereto. In other embodiments, a through hole (not shown) is disposed on the bottom plate 112, and the first protrusion 120 penetrates the through hole to be fixed with the first case 110.

Figure 4:
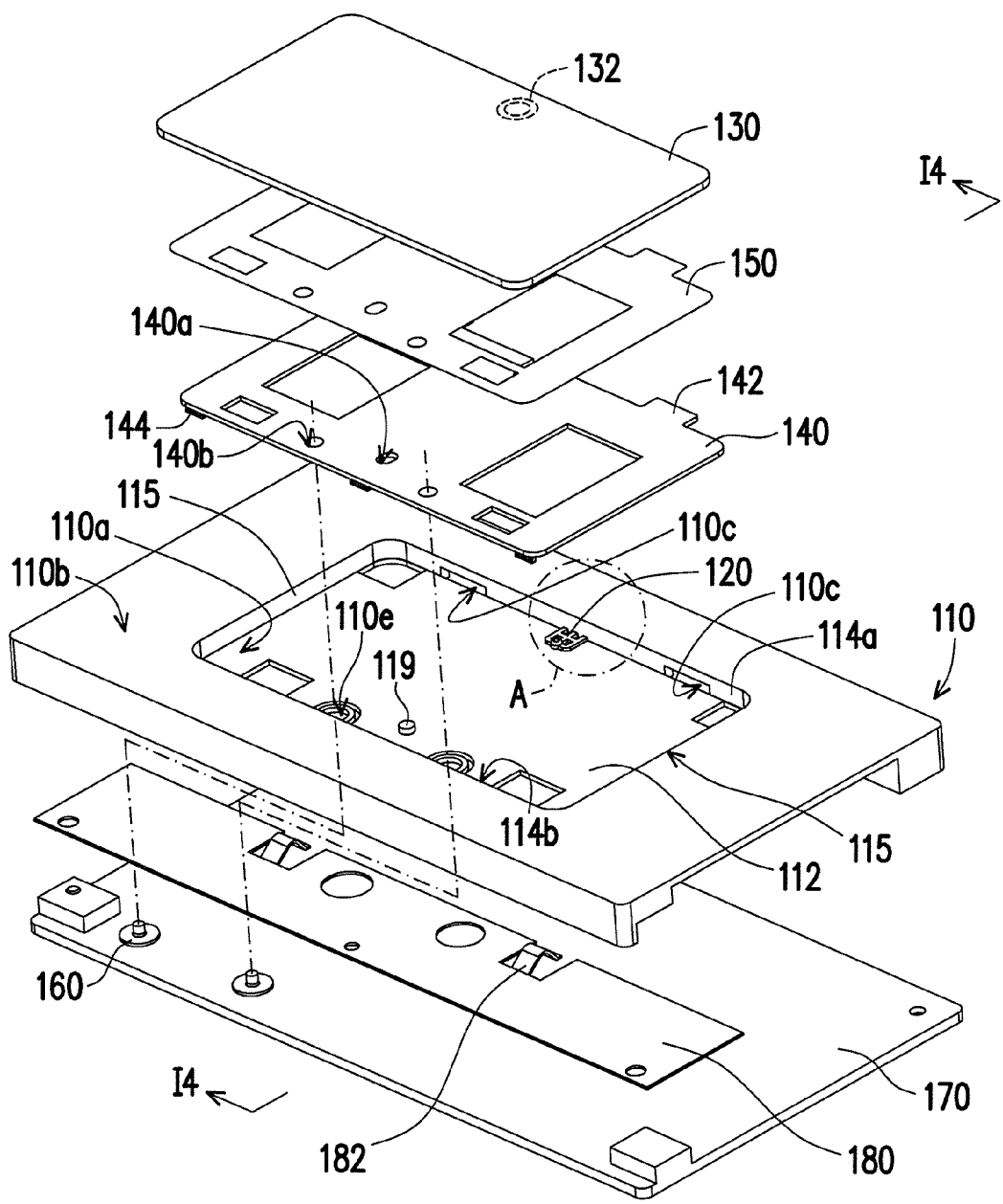
FIG. 4 is another exploded view of the electronic device in FIG. 1.
Figure 5:
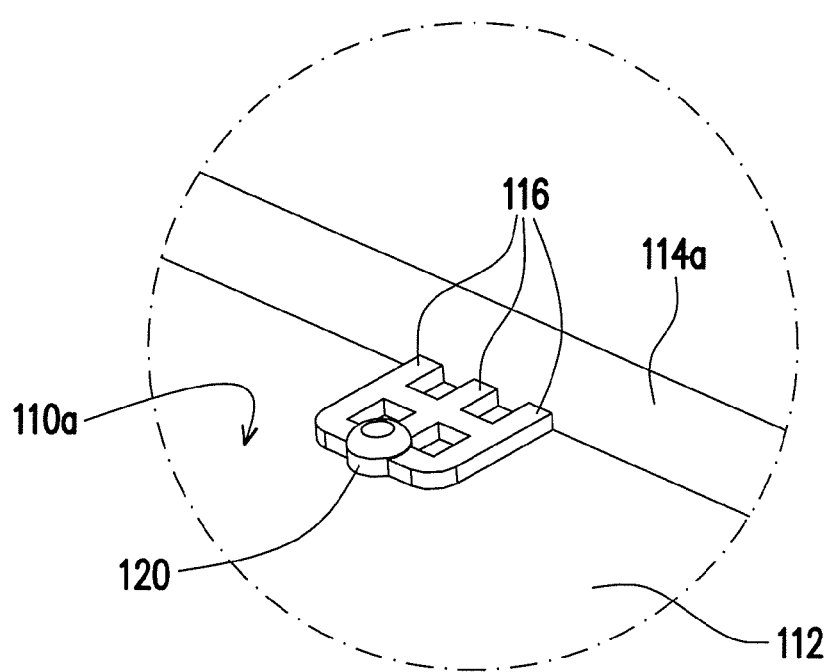
FIG. 5 is a partially enlarged view of the area A shown in FIG. 4.

FIG. 4 is another exploded view of the electronic device in FIG. 1. FIG. 5 is a partially enlarged view of the area A shown in FIG. 4. Referring to FIG. 2, FIG. 4 and FIG. 5, the first case 110 of the present embodiment further has plural ribs 116 which are disposed in the accommodating cavity 110a and are connected to the bottom plate 112 and the first protrusion 120. Because of this disposition, the connection between the first protrusion 120 and the first case 100 could be strengthened and the sense of touch of the click pad 130 could be maintained. In addition, the ribs 116 extend and are connected to the first side wall 114a from the bottom plate 112. Therefore, the click pad 130 could further maintain the sense of touch.

Referring to FIG. 2 and FIG. 4, in the present embodiment, the electronic device 100 further includes an adhesive tape 150 located between the click pad 130 and the frame 140. Therefore, the adhesive tape 150 is used for fixing the click pad 130 firmly to the frame 140. In addition, in other embodiments, the click pad 130 and the frame 140 could be assembled by the lock attached method.

Figure 6:
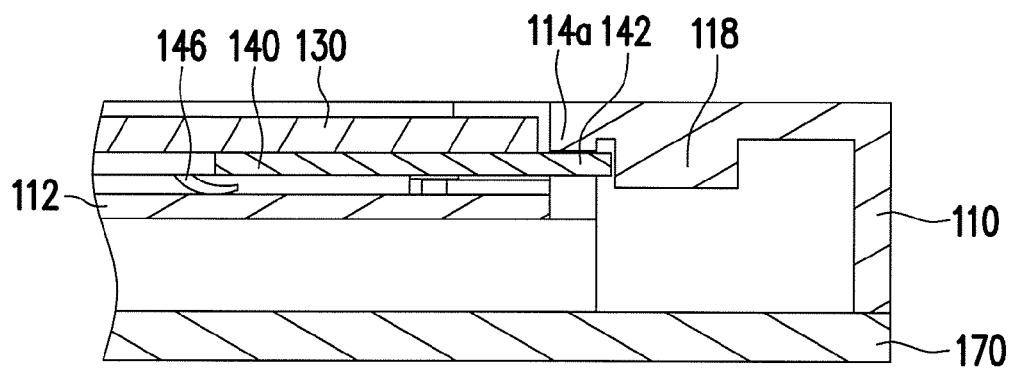
FIG. 6 is a partial cross-sectional view of the click pad assembled in the accommodating cavity taken along section line I2-I2 in FIG. 2.
Figure 7:
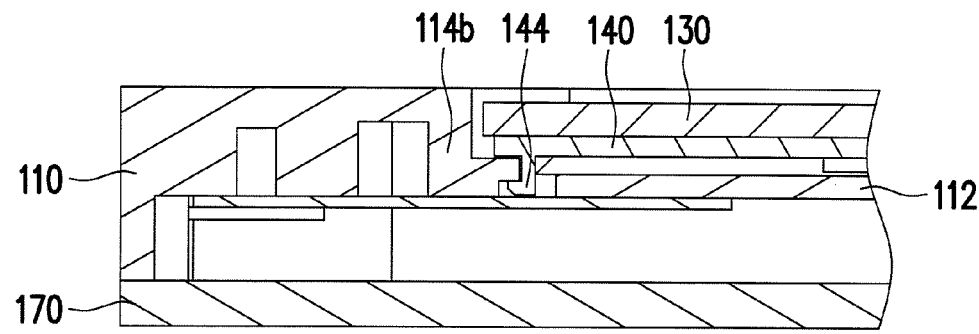
FIG. 7 is a partial cross-sectional view of the click pad assembled in the accommodating cavity taken along section line I3-I3 in FIG. 2.

FIG. 6 is a partial cross-sectional view of the click pad assembled in the accommodating cavity taken along section line I2-I2 in FIG. 2. FIG. 7 is a partial cross-sectional view of the click pad assembled in the accommodating cavity taken along section line I3-I3 in FIG. 2. Referring to FIG. 2, FIG. 4, FIG. 6 and FIG. 7, the frame 140 of the present embodiment has a first hook 142 and a second hook 144, and the first case 110 further has a first opening 110c and a second opening 110d. The first hook 142 and the second hook 144 are located at two opposite sides of the frame 140. The first opening 110c is disposed on the first side wall 114a, and the second opening 110d is disposed on the bottom plate 112. The first hook 142 is inserted into the first opening 110c and the first hook 142 leans against the bottom of the first side wall 114a. After that, the frame 140 is pressed in the accommodating cavity 110a so that the second hook 144 is inserted into the second opening 110d and then engages with the bottom of the second side wall 114b. Hence, the click pad 130 is assembled in the accommodating cavity 110a and limited by the first hook 142 and the second hook 144 so that the click pad 130 couldn't move along a first direction X1, wherein the first direction X1, for example, is normal to the surface 110b of the first case 110.

In addition, the first case 110 of this embodiment further has a platform 118. The platform 118 is disposed on the bottom of the first case 110 and close to the first side wall 114a. The first hook 142 contacts the platform 118 when the first hook 142 is inserted into the first opening 110c. Therefore, after the click pad 130 is assembled into the accommodating cavity 110a by the frame 140, the click pad 130 is limited by the platform 118 so that the click pad 130 could not move along a second direction X2, wherein the second direction X2 is paralleled to the two third side walls 115, and the second direction X2 is perpendicular to the first direction X1.

Furthermore, the frame 140 of the present embodiment has a position limiting slot 140a, and the first case 110 further has a second protrusion 119 disposed on the bottom plate 112. The longitudinal direction of the position limiting slot 140a is paralleled with the extension direction of the two third side walls 115, and the position limiting slot 140a is located between the first hook 142 and the second hook 144. When the second protrusion 119 is inserted into the position limiting slot 140a, the second protrusion 119 leans against two inner wall surfaces of the position limiting slot 140a, and the click pad 130 is limited so that the click pad 130 couldn't move along a third direction X3 by the second protrusion 119, wherein the third direction X3 is perpendicular to the first direction X1 or the second direction X2.

In this embodiment, the electronic device 100 further includes a fastener 160. The first case 110 further has a first fastening hole 110e disposed on the bottom plate 112, and the frame 140 has a second fastening hole 140b corresponding to the position of the first fastening hole 110e, and the fastener 160 penetrates through the first fastening hole 110e and the second fastening hole 140b so that the frame 140 and the first case 110 are fixed together. Because of this disposition, under the condition that the electronic device 100 is instantly impacted, the frame 140 and the first case 110 are tightly locked and attached to each other so that the click pad 130 couldn't fall out. Therefore, a high reliability of the electronic 100 could be maintained.

Figure 8:
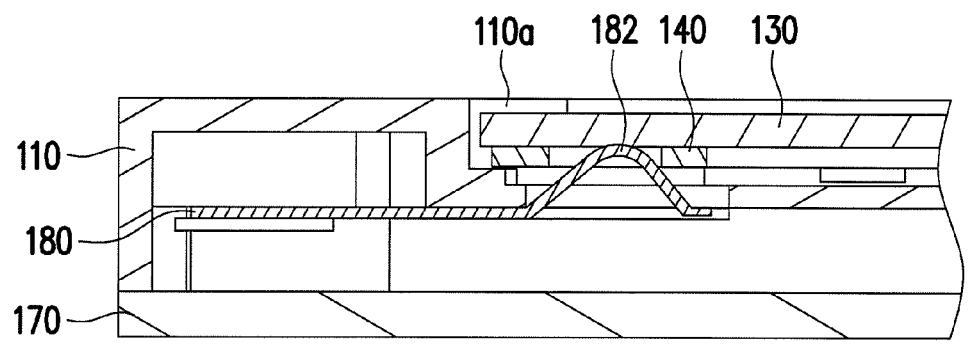
FIG. 8 is a partial cross-sectional view of the click pad assembled in the accommodating cavity taken along section line I4-I4 in FIG. 4.

FIG. 8 is a partial cross-sectional view of the click pad assembled in the accommodating cavity taken along section line I4-I4 in FIG. 4. Referring to FIG. 2, FIG. 4 and FIG. 8, in the present embodiment, the electronic device 100 further includes a second case 170 and a bracket 180, wherein the bracket 180 is a component, for example, used for supporting the keyboard 190 (as shown in FIG. 1), the second case 170 is assembled in the first case 110 so that the bracket 180 is clamped between the first case 110 and the second case 170. The bracket 180 is made by conductive materials, and the bracket 180 and the click pad 130 are electrically connected. Because of this disposition, the circuit board (not shown) of the click pad 130 is connected to the ground through the bracket 180. In addition, the bracket 180 has a resilient piece 182. The resilient piece 182 leans against the click pad 130 to be electrically connected with the bracket 180 and the click pad 130. Because of this disposition, except that the resilient piece 182 is used to connect the circuit board of the click pad 130 to the ground, the resilient piece 182 is also used for supporting the click pad 130 to prevent the situation that the click pad 130 is recessed after long hours of use.

Base on the above, the frame 140 of the present embodiment has a resilient arm 146 (as shown in FIG. 6) that is disposed on the bottom of the frame 140 and the resilient arm 146 leans against the bottom plate 112. Therefore, the click pad 130 is supported on the bottom plate 112 by the resilient arm 146 so that the click pad 130 is less likely to be recessed.

In addition, in the electronic device 100 of the present embodiment, the resilient piece 182 of the bracket 180 is used to leans against the click pad 130 and be electrically connected with the click pad 130 and the bracket 180, so that the circuit board of the click pad 130 could connect to the ground, wherein the click pad 130 and the bracket 180 are electrically connected to each other by their own method. This part is explained by example as followings.

Figure 9:
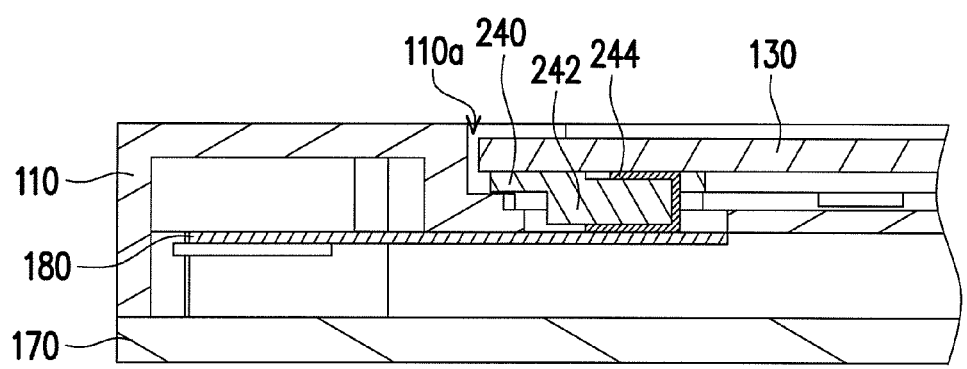
FIG. 9 is a partial cross-sectional view of the click pad assembled in the accommodating cavity of another embodiment of the invention.

FIG. 9 is a partial cross-sectional view of the click pad assembled in the accommodating cavity of another embodiment of the invention. Referring to FIG. 9, in the present embodiment, the frame 240 has a bonding portion 242 extended from the bottom of the frame 240, and the outside of the bonding portion 242 is coated with a conductive fabric 244. The bonding portion 242 leans against the bracket 180 to be electrically connected with the bracket 180 and the click pad 130. Therefore, except that the bonding portion 242 is used to connect the circuit board of the click pad 130 to the ground, the bonding portion 242 could also provide a good support for the click pad 130 to prevent the situation that the click pad 130 is recessed.

In summary, the electronic device of the invention uses the first protrusion, that is directly disposed on the bottom plate of the first case, so that the skewness when assembling of the triggering switch component is reduced and the pressing stroke of the switch is fixed. Therefore, the click pad could provide a good sense of touch. In addition, the electronic device doesn't need an extra supporting plate for triggering the switch so that the number of elements in the electronic device will be reduced and it is more convenient to assemble the electronic device. Furthermore, the first case does not need having a rectangular opening so that the structural strength of the electronic device could be well maintained. In addition, when this invention has the bracket, the click pad could be connected to the ground. Furthermore, when the bracket has the resilient piece or the frame has the resilient arm, the click pad could be supported to prevent the recession of the click pad.

Although the invention has been disclosed with reference to the aforesaid embodiments, they are not intended to limit the invention. It will be apparent to one of ordinary skill in the art that modifications and variations to the described embodiments may be made without departing from the spirit and the scope of the invention. Accordingly, the scope of the invention will be defined by the attached claims and not by the above detailed descriptions.

What is claimed is:

1. An electronic device, comprising:
    a first case, having an accommodating cavity, wherein the accommodating cavity is recessed from a surface of the first case and the accommodating cavity forms a bottom plate, a first side wall and a second side wall erected on one pair of opposite sides of the bottom plate, and two third side walls erected on another pair of opposite sides of the bottom plate;
    a first protrusion, disposed on the bottom plate;
    a click pad, having a switch; and
    a frame, disposed between the first case and the click pad, wherein the click pad is assembled in the accommodating cavity by the frame, and the switch faces directly to the first protrusion.

2. The electronic device as recited in claim 1, further comprising a second case and a bracket, wherein the second case is assembled to the first case so that the bracket is clamped between the first case and the second case, and the bracket is made by conductive materials, and the bracket and the click pad are electrically connected.

3. The electronic device as recited in claim 2, wherein the bracket has a resilient piece, the resilient piece leans against the click pad and the resilient piece is electrically connected with the bracket and the click pad.

4. The electronic device as recited in claim 2, wherein the frame has a bonding portion extended from the bottom of the frame, and the bonding portion is electrically conductive and leans against the bracket to be electrically connected with the bracket and the click pad.

5. The electronic device as recited in claim 1, wherein the frame has a resilient arm disposed on the bottom of the frame and the resilient arm leans against the bottom plate.

6. The electronic device as recited in claim 1, wherein the frame has a first hook and a second hook, and the first case further has a first opening and a second opening, the first hook and the second hook are located at two sides of the frame, the first opening is disposed on the first side wall, and the second opening is disposed on the bottom plate, the first hook is inserted into the first opening and leans against the bottom of the first side wall, the second hook is inserted into the second opening and the second hook engages with the bottom of the second side wall.

7. The electronic device as recited in claim 6, wherein the first case further has a platform disposed on the bottom of the first case, when the first hook is inserted into the first opening, the first hook contacts the platform, and the click pad is limited by the platform.

8. The electronic device as recited in claim 6, wherein the frame has a position limiting slot, and the first case further has a second protrusion disposed on the bottom plate, the position limiting slot is paralleled with the two third side walls and located between the first hook and the second hook, when the second protrusion is inserted into the position limiting slot, the click pad is limited by the second protrusion.

9. The electronic device as recited in claim 1, further comprising a fastener, wherein the first case further has a first fastening hole disposed on the bottom plate, and the frame has a second fastening hole corresponding to a position of the first fastening hole, and the fastener is penetrated through the first fastening hole and the second fastening hole.

10. The electronic device as recited in claim 1, wherein the first case has at least one rib disposed in the accommodating cavity and the rib is connected to the bottom plate and the first protrusion.

11. The electronic device as recited in claim 10, wherein the rib extends and is connected to the first side wall from the bottom plate.

12. The electronic device as recited in claim 1, further comprising an adhesive tape located between the click pad and the frame.

* * * * *